US012326089B2

(12) United States Patent
Hardikar et al.

(10) Patent No.: US 12,326,089 B2
(45) Date of Patent: Jun. 10, 2025

(54) SEAL ASSEMBLY FOR A GAS TURBINE ENGINE

(71) Applicant: General Electric Company, Schenectady, NY (US)

(72) Inventors: Narendra Anand Hardikar, Bengaluru (IN); David Raju Yamarthi, Bengaluru (IN); Ravindra Shankar Ganiger, Bengaluru (IN); Mohan Kannaiah Raju, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/357,301

(22) Filed: Jul. 24, 2023

(65) Prior Publication Data

US 2024/0352864 A1 Oct. 24, 2024

(30) Foreign Application Priority Data

Apr. 24, 2023 (IN) ............................. 202311029504

(51) Int. Cl.
*F01D 11/08* (2006.01)
*F01D 25/16* (2006.01)

(52) U.S. Cl.
CPC .............. *F01D 11/08* (2013.01); *F01D 25/16* (2013.01); *F05D 2220/32* (2013.01); *F05D 2240/50* (2013.01); *F05D 2240/55* (2013.01)

(58) Field of Classification Search
CPC .. F01D 11/08; F01D 2225/16; F05D 2220/32; F05D 2240/50; F05D 2240/55
See application file for complete search history.

(56) References Cited

U.S. PATENT DOCUMENTS 2,970,808 A 2/1961 Coppa
3,146,992 A 9/1964 Farrell
3,511,511 A 5/1970 Voitik
(Continued)

FOREIGN PATENT DOCUMENTS

CN 108374694 A 8/2018
CN 109973658 A 7/2019
(Continued)

OTHER PUBLICATIONS

Bruce et al., Advanced Seal Technology Role in Meeting Next Generation Turbine Engine Goals, National Aeronautics and Space Administration Lewis Research Center, France, May 11-15, 1998, pp. 1-14.
Chupp et al., Sealing in Turbomachinery, NASA/TM-2006-214341, National Aeronautics and Space Administration, Cleveland, OH, 2006, 62 Pages.
(Continued)

*Primary Examiner* — David E Sosnowski
*Assistant Examiner* — Aye S Htay
(74) *Attorney, Agent, or Firm* — Dority & Manning, P.A.

(57) ABSTRACT

A turbine engine includes a rotor, a stator having a carrier, and a seal assembly that is disposed between the rotor and the stator. The seal assembly includes a plurality of seal segments. The plurality of seal segments includes a seal segment having a seal face forming a fluid bearing with the rotor, a body, and an aft bearing extending from the body. The turbine engine further includes a roller assembly having one or more rolling elements coupled to one of the aft bearing or the carrier. The one or more rolling elements in rolling contact with the other of the aft bearing or the carrier.

18 Claims, 9 Drawing Sheets

(56) References Cited

U.S. PATENT DOCUMENTS 4,251,185 A 2/1981 Karstensen
4,307,993 A 12/1981 Hartel
4,334,822 A 6/1982 Rossmann
4,632,635 A 12/1986 Thoman et al.
4,747,603 A 5/1988 Sugino et al.
4,856,963 A 8/1989 Klapproth et al.
4,974,821 A 12/1990 Balsells
4,983,051 A 1/1991 Hibner et al.
5,100,158 A 3/1992 Gardner
5,143,384 A 9/1992 Lipschitz
5,301,957 A 4/1994 Hwang et al.
5,330,321 A * 7/1994 Roberts .................. F01D 11/18 415/138
5,388,843 A 2/1995 Sedy
5,431,533 A 7/1995 Hobbs
5,509,664 A 4/1996 Borkiewicz
5,603,510 A * 2/1997 Sanders ................ F01D 11/025 415/173.3
5,639,210 A 6/1997 Carpenter et al.
5,975,537 A 11/1999 Turnquist et al.
6,145,843 A 11/2000 Hwang
6,202,302 B1 3/2001 Descoteaux
6,210,103 B1 * 4/2001 Ramsay ................. F16J 15/406 415/230
6,273,671 B1 8/2001 Ress, Jr.
6,368,054 B1 4/2002 Lucas
6,505,837 B1 1/2003 Heshmat
6,514,041 B1 2/2003 Matheny et al.
6,543,992 B2 4/2003 Webster
6,655,696 B1 12/2003 Fang et al.
6,692,006 B2 2/2004 Holder
6,811,154 B2 11/2004 Proctor et al.
6,840,519 B2 * 1/2005 Dinc ...................... F16J 15/445 277/303
6,877,952 B2 4/2005 Wilson
6,895,757 B2 * 5/2005 Mitchell .................. F23R 3/50 60/753
6,896,038 B2 5/2005 Arilla et al.
7,066,470 B2 6/2006 Turnquist et al.
7,079,957 B2 7/2006 Finnigan et al.
7,086,649 B2 8/2006 Plona
7,125,223 B2 10/2006 Turnquist et al.
7,334,980 B2 2/2008 Trinks et al.
7,367,776 B2 5/2008 Albers et al.
7,435,049 B2 10/2008 Ghasripoor et al.
7,438,526 B2 10/2008 Enderby
7,448,849 B1 11/2008 Webster et al.
7,459,081 B2 12/2008 Koenig et al.
7,596,954 B2 10/2009 Penda et al.
7,614,792 B2 11/2009 Wade et al.
7,726,660 B2 6/2010 Datta
7,752,849 B2 7/2010 Webster et al.
7,901,186 B2 3/2011 Cornett et al.
8,002,285 B2 8/2011 Justak
8,047,765 B2 11/2011 Wilson et al.
8,052,380 B2 11/2011 Willett, Jr.
8,056,902 B2 11/2011 Roddis et al.
8,113,771 B2 2/2012 Turnquist et al.
8,142,141 B2 3/2012 Tesh et al.
8,177,476 B2 5/2012 Andrew et al.
8,186,945 B2 5/2012 Bhatnagar et al.
8,210,799 B1 7/2012 Rawlings
8,240,986 B1 8/2012 Ebert
8,434,766 B2 5/2013 Zeng et al.
8,556,578 B1 10/2013 Memmen et al.
8,608,427 B2 12/2013 Bock
8,641,045 B2 2/2014 Justak
8,678,742 B2 3/2014 Klingels
8,790,067 B2 7/2014 McCaffrey et al.
8,864,443 B2 10/2014 Narita et al.
8,985,938 B2 3/2015 Petty
9,045,994 B2 6/2015 Bidkar et al.
9,068,471 B2 6/2015 Klingels
9,103,223 B2 8/2015 Uehara et al.
9,115,810 B2 8/2015 Bidkar et al.
9,145,785 B2 9/2015 Bidkar et al.
9,169,741 B2 10/2015 Szwedowicz et al.
9,200,530 B2 12/2015 McCaffrey
9,255,489 B2 2/2016 DiTomasso et al.
9,255,642 B2 2/2016 Bidkar et al.
9,359,908 B2 6/2016 Bidkar et al.
9,394,801 B2 7/2016 Willett, Jr.
9,435,218 B2 9/2016 Casavant et al.
9,528,554 B2 12/2016 Moratz
9,587,746 B2 3/2017 Bidkar et al.
9,598,971 B2 3/2017 Hasnedl et al.
9,683,451 B2 6/2017 Sonokawa et al.
9,869,196 B2 1/2018 Day et al.
9,869,205 B2 * 1/2018 Ganiger ................ F16C 35/042
9,890,650 B2 2/2018 Von Berg et al.
9,963,988 B2 5/2018 Swedowicz et al.
9,976,435 B2 5/2018 Borja et al.
10,041,534 B2 8/2018 Ganiger et al.
10,060,280 B2 * 8/2018 Crawley, Jr. ............ F01D 9/065
10,077,782 B2 9/2018 Zhang et al.
10,100,660 B2 10/2018 Sippel et al.
10,161,259 B2 12/2018 Gibson et al.
10,184,347 B1 1/2019 D'Ambruoso
10,190,431 B2 1/2019 Bidkar et al.
10,196,980 B2 2/2019 Ganiger et al.
10,323,541 B2 6/2019 Ganiger et al.
10,344,612 B2 7/2019 Hudson et al.
10,352,455 B2 7/2019 Berard et al.
10,385,715 B2 8/2019 Wong et al.
10,415,418 B2 9/2019 McCaffrey et al.
10,415,419 B2 9/2019 Sun et al.
10,422,431 B2 9/2019 Chuong et al.
10,436,070 B2 10/2019 McCaffrey
10,443,424 B2 10/2019 McCaffrey
10,533,446 B2 1/2020 Barak et al.
10,920,593 B2 2/2021 Millier et al.
10,962,024 B2 3/2021 Nesteroff et al.
10,962,118 B2 3/2021 Duffy et al.
10,995,861 B2 5/2021 Hilbert et al.
11,047,481 B2 6/2021 Bidkar et al.
11,193,590 B2 12/2021 Black
2001/0007632 A1 7/2001 Pesek et al.
2003/0048441 A1 * 3/2003 Manning ............... G01J 3/4532 356/326
2007/0053772 A1 3/2007 Couture et al.
2007/0132193 A1 * 6/2007 Wolfe .................... F16J 15/445 277/415
2008/0056895 A1 3/2008 Senoo
2008/0265513 A1 10/2008 Justak
2009/0296281 A1 * 12/2009 Baker ..................... F16C 27/04 360/245.3
2010/0078893 A1 4/2010 Turnquist et al.
2012/0177484 A1 7/2012 Lusted et al.
2012/0211944 A1 8/2012 Nishimoto et al.
2012/0223483 A1 9/2012 Bidkar et al.
2012/0248704 A1 10/2012 Fennell et al.
2013/0034423 A1 2/2013 Adaickalasamy et al.
2014/0008871 A1 1/2014 Bidkar et al.
2014/0062024 A1 3/2014 Bidkar et al.
2014/0117624 A1 5/2014 Bidkar et al.
2014/0119912 A1 5/2014 Bidkar et al.
2015/0159498 A1 6/2015 Mukhopadhyay et al.
2016/0010480 A1 1/2016 Bidkar et al.
2016/0097291 A1 4/2016 Hayford et al.
2016/0130963 A1 5/2016 Wilson et al.
2016/0138412 A1 5/2016 Rioux
2016/0376907 A1 12/2016 O'Leary et al.
2017/0051621 A1 2/2017 Ackermann et al.
2017/0051834 A1 * 2/2017 Webster .................. F01D 11/02
2017/0211402 A1 7/2017 Peters et al.
2018/0045066 A1 2/2018 Chuong
2018/0058240 A1 3/2018 Chuong et al.
2018/0372229 A1 12/2018 Bidkar et al.
2019/0072186 A1 3/2019 Bidkar et al.
2019/0085712 A1 3/2019 Wesling et al.
2019/0203842 A1 * 7/2019 Bidkar .................. F01D 11/003
2019/0218926 A1 7/2019 DiFrancesco et al.
2019/0276851 A1 9/2019 Lin

(56) References Cited

U.S. PATENT DOCUMENTS

| | | | |
|---|---|---|---|
| 2020/0040735 | A1 | 2/2020 | Millier et al. |
| 2020/0063588 | A1 | 2/2020 | Morliere et al. |
| 2020/0102845 | A1 | 4/2020 | DiFrancesco et al. |
| 2020/0191162 | A1 | 6/2020 | Weihard et al. |
| 2020/0318489 | A1 | 10/2020 | Webb |
| 2020/0362716 | A1 | 11/2020 | Glahn et al. |
| 2021/0207487 | A1 | 7/2021 | George et al. |
| 2022/0154580 | A1 | 5/2022 | Gainger et al. |
| 2022/0235667 | A1 | 7/2022 | Mizumi et al. |
| 2022/0349475 | A1 | 11/2022 | Nguyen et al. |

FOREIGN PATENT DOCUMENTS

| | | | |
|---|---|---|---|
| CN | 113446069 | A | 9/2021 |
| DE | 4011710 | A1 | 10/1991 |
| EP | 2239423 | A1 | 10/2010 |
| FR | 3042555 | A1 | 4/2017 |
| FR | 3059041 | B1 | 5/2020 |
| JP | S57195803 | A | 12/1982 |
| JP | S58206807 | A | 12/1983 |
| JP | S60111004 | A | 6/1985 |
| WO | WO2010/112421 | A1 | 10/2010 |

OTHER PUBLICATIONS

Delgado et al., A Review of Engine Seal Performance and Requirements for Current and Future Army Engine Platforms, NASA/TM-2008-215161, 43$^{rd}$ Joint Propulsion Conference Co- Sponsored by AIAA, ASME, SAE, and ASEE, Cincinnati, OH, Jul. 8-11, 2007, 22 Pages.

Grondahl et al., Film Riding Leaf Seals for Improved Shaft Sealing, Proceeding of ASME Turbo Expo 2010: Power for Land, Sea and Air, GT2010-23629, Glasgow, UK, Jun. 14-18, 2010, 8 Pages.

Hamidizadeh, Study of Magnetic Properties and Demagnetization Models of Permanent Magnet for Electric Vehicles Application, Thesis McGill University, 2016, 84 Pages. https://escholarship.mcgill.ca/downloads/qb98mj16r.pdf.

Moore, Lip Seal, Materials Science, Fluoroelastomers Handbook 2006, 16 Pages. Retrieved Dec. 9, 2022 from Weblink https://www.sciencedirect.com/topics/materials-science/lip-seal.

Munson et al., Development of Film Riding Face Seals for a Gast Turbine Engine, Tribology Transactions, vol. 35, Issue 1, 1992, pp. 65-70.

Steinetz et al., Advanced Seal Technology Role in Meeting Next Generation Turbine Engine Goals, RTO AVT Symposium on Design Principles and Methods for Aircraft Gas Turbine Engines, Toulouse, France, May 11-15, 1998, 14 Pages.

* cited by examiner

SEAL ASSEMBLY FOR A GAS TURBINE ENGINE

PRIORITY INFORMATION

The present application claims priority to Indian Patent Application Number 202311029504 filed on Apr. 24, 2023.

FIELD

The present disclosure relates to turbine engines, and more specifically, to turbine engines including a seal assembly.

BACKGROUND

Gas turbine engines, such as turbofan engines, may be used for aircraft propulsion. A turbofan engine generally includes a bypass fan section and a turbomachine such as a gas turbine engine to drive the bypass fan. The turbomachine generally includes a compressor section, a combustion section, and a turbine section in a serial flow arrangement. Both the compressor section and the turbine section are driven by one or more rotor shafts and generally include multiple rows or stages of rotor blades coupled to the rotor shaft. Each individual row of rotor blades is axially spaced from a successive row of rotor blades by a respective row of stator or stationary vanes. A radial gap is formed between an inner surface of the stator vanes and an outer surface of the rotor shaft.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
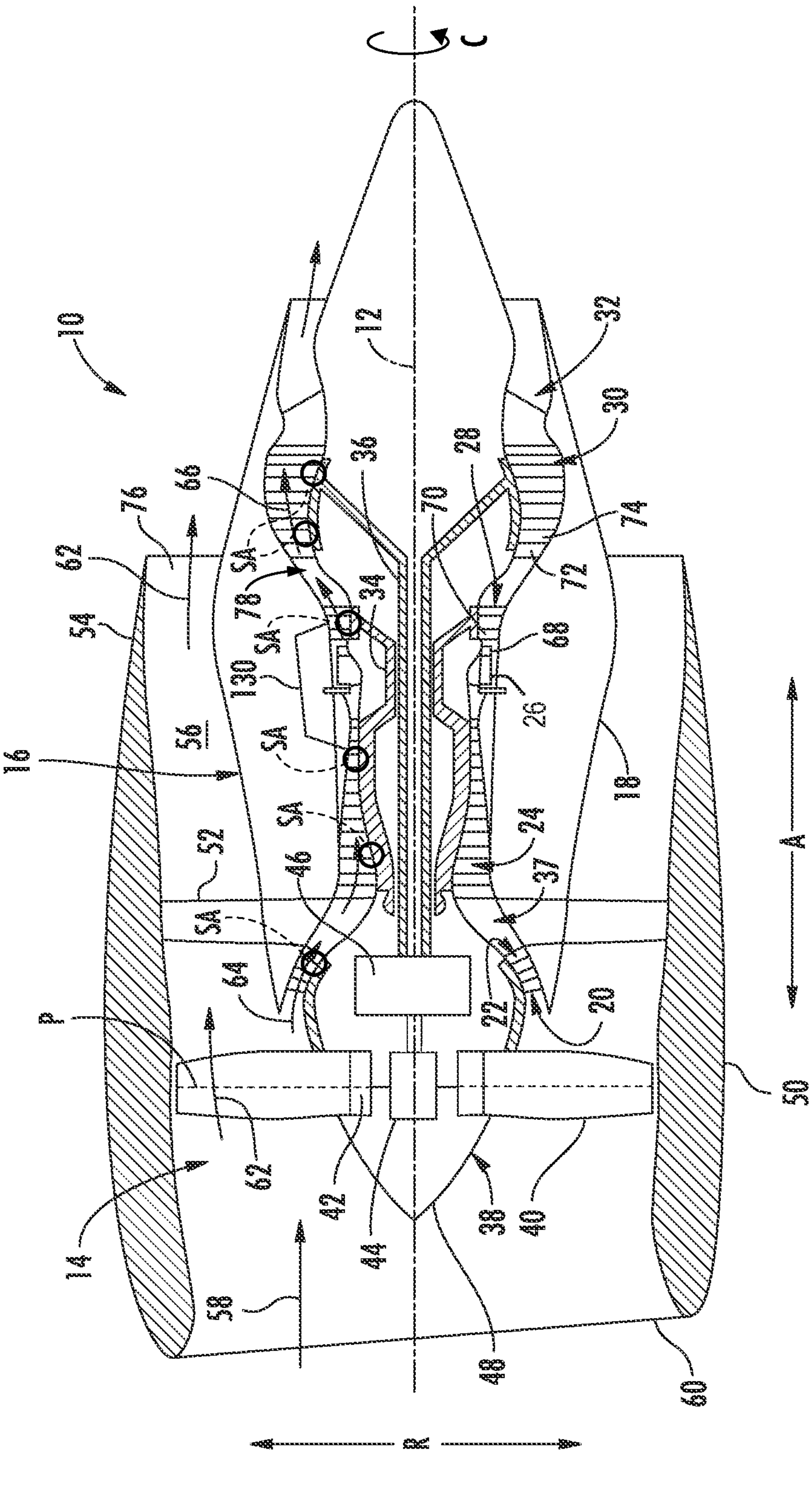
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" or "turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a “low turbine” or “low speed turbine” defines a component configured to operate at a rotational speed, such as a maximum allowable rotational speed, lower than a “high turbine” or “high speed turbine” of the engine.

The terms “forward” and “aft” refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms “upstream” and “downstream” refer to the relative direction with respect to fluid flow in a fluid pathway. For example, “upstream” refers to the direction from which the fluid flows, and “downstream” refers to the direction to which the fluid flows.

The term “biasing element” refers to an object that is configured to deform elastically and store mechanical energy as a result of such deformation. A biasing element may be configured to deform linearly through extension or compression, which is referred to herein as a “linear spring”; may be configured to deform in a twisting manner through rotation about its axis, which is referred to herein as a “torsional spring”; or in any other suitable manner.

The present disclosure is generally related to a seal member support system for a turbomachine of a gas turbine engine. A turbomachine generally includes a compressor section including a low-pressure compressor and a high-pressure compressor, a combustion section, and a turbine section including a high-pressure turbine and a low-pressure turbine arranged in serial-flow order. Each of the low-pressure compressor, the high-pressure compressor, the high-pressure turbine and the low-pressure turbine include sequential rows of stationary or stator vanes axially spaced by sequential rows of rotor blades. The rotor blades are generally coupled to a rotor shaft and the stator vanes are mounted circumferentially in a ring configuration about an outer surface of the rotor shaft. Radial gaps are formed between the outer surface of the rotor shaft and an inner portion of each ring or row of stator vanes.

During operation, it is desirable to control (reduce or prevent) compressed air flow or combustion gas flow leakage through these radial gaps. Ring seals are used to form a film bearing seal to seal these radial gaps. Ring seals generally include a plurality of seal shoe or seal member segments, and the ring seals are generally held by carriers. As pressure builds in the compressor section and/or the turbine section, the seal members are forced radially outwardly and form a bearing seal between the outer surface of the rotor shaft and the respective seal members. To reduce wear on the rotor shaft and/or the seal members, it is desirable to maintain a positive radial clearance between the seal members and the outer surface of the rotor shaft under various operating conditions of the turbomachine. As a result, the seal members often move radially relative to the carrier to maintain the positive radial clearance.

Disclosed herein is a gas turbine engine having a carrier and a seal assembly radially movable relative to the carrier. The seal assembly includes an aft bearing. The gas turbine engine advantageously includes a roller assembly disposed at the aft bearing. The roller assembly includes one or more rolling elements for maintaining rolling contact between the carrier and the aft bearing of the seal assembly. The rolling elements may advantageously reduce the friction between the carrier and the seal assembly, while maintaining desired clearance between the carrier and the seal assembly and allowing for small radial movements. Additionally, the roller assembly does not require any leakage airflow (e.g., compressor cooling airflow) at the aft bearing, which advantageously increases the overall efficiency of the gas turbine engine when compared to prior designs.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, sometimes also referred to as a “turbofan engine.” As shown in FIG. 1, the gas turbine engine 10 defines an axial direction A (extending parallel to a longitudinal centerline 12 provided for reference), a radial direction R. and a circumferential direction C extending about the longitudinal centerline 12. In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low-pressure (LP) compressor 22 and a high-pressure (HP) compressor 24; a combustion section 26; a turbine section including a high-pressure (HP) turbine 28 and a low-pressure (LP) turbine 30; and a jet exhaust nozzle section 32. A high-pressure (HP) shaft 34 (which may additionally or alternatively be a spool) drivingly connects the HP turbine 28 to the HP compressor 24. A low-pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gear box 46, and the fan blades 40, disk 42, and pitch change mechanism 44 are together rotatable about the longitudinal centerline 12 by LP shaft 36 across the power gear box 46. The power gear box 46 includes a plurality of gears for adjusting a rotational speed of the fan 38 relative to a rotational speed of the LP shaft 36, such that the fan 38 may rotate at a more efficient fan speed.

Referring still to the exemplary embodiment of FIG. 1, the disk 42 is covered by rotatable front hub 48 of the fan section 14 (sometimes also referred to as a “spinner”). The front hub 48 aerodynamically contoured to promote an airflow through the plurality of fan blades 40.

Additionally, the exemplary fan section 14 includes an annular fan casing or nacelle 50 that circumferentially surrounds the fan 38 and/or at least a portion of the turbomachine 16. It should be appreciated that the nacelle 50 is supported relative to the turbomachine 16 by a plurality of circumferentially-spaced outlet guide vanes 52 in the embodiment depicted. Moreover, a downstream section 54 of the nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the nacelle 50 and fan section 14. As the volume of air 58 passes across the fan blades 40, a first portion of air 62 is directed or routed into the bypass airflow passage 56 and a second portion of air 64 as indicated by arrow 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (i.e., including the nacelle 50), in other embodiments, the gas turbine engine 10 may be an unducted gas turbine engine (such that the fan 38 is an unducted fan, and the outlet guide vanes 52 are cantilevered from, e.g., the outer casing 18). Additionally, or alternatively, although the gas turbine engine 10 depicted is configured as a geared gas turbine engine (i.e., including the power gear box 46) and a variable pitch gas turbine engine (i.e., including a fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

Figure 2:
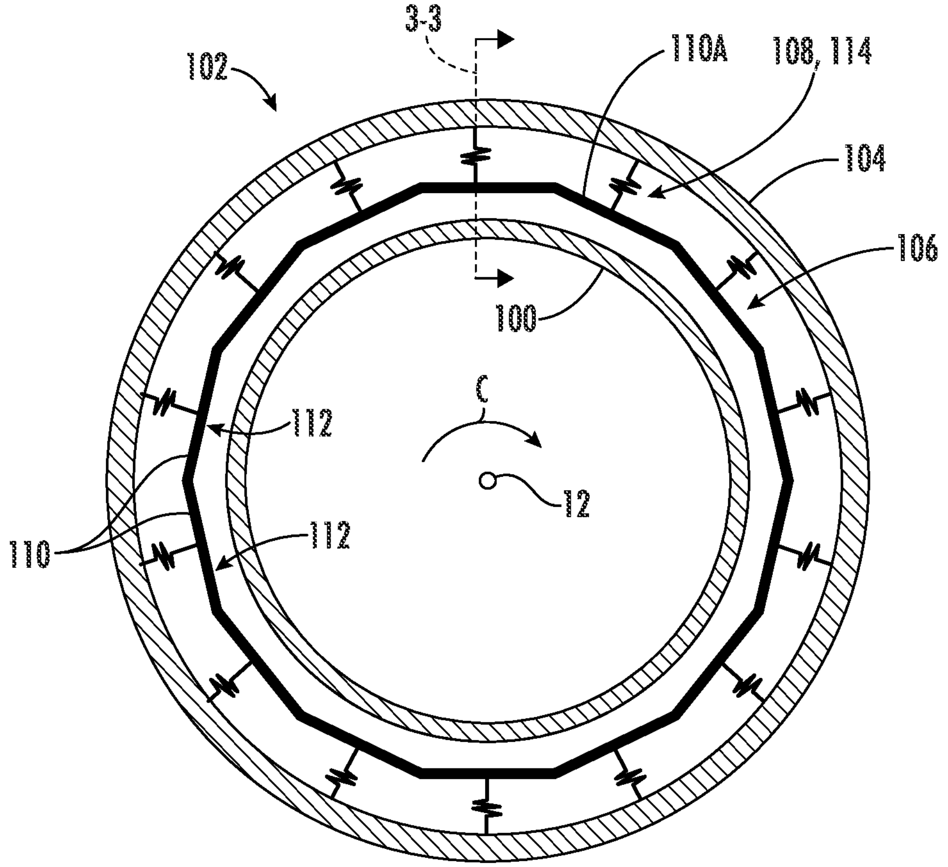
FIG. 2 is a cross sectional, schematic view of a portion of the turbomachine of FIG. 1, in accordance with embodiments of the present disclosure.

Referring now to FIG. 2, a cross sectional, schematic view of a portion of the turbomachine 16 of FIG. 1 is provided. As will be appreciated, the exemplary turbomachine 16 generally includes a rotor 100, a stator 102 having a carrier 104, a seal assembly 106 disposed between the rotor 100 and the stator 102, and a seal support assembly 108. The rotor 100 may be any rotor of the turbomachine 16, such as the LP shaft 36, the HP shaft 34, etc. By way of example, referring briefly back to FIG. 1, Circles SA have been added to FIG. 1 to provide example locations that the seal assembly 106 and seal support assembly 108 of the present disclosure may be incorporated into a turbomachine of the present disclosure. FIG. 2 may be a cross sectional view in a radial-circumferential plane at the axial location of one of the Circles SA shown in FIG. 1.

Referring still to FIG. 2, and as will be explained in more detail below, the exemplary seal assembly 106 includes a plurality of seal segments 110 arranged along the circumferential direction C. Each seal segment 110 of the plurality of seal segments 110 has a seal face 112 configured to form a fluid bearing with the rotor 100, and more specifically a radial fluid bearing (i.e., configured to constrain the rotor 100 along the radial direction R). The fluid bearing may be a hydrostatic fluid bearing, a hydrodynamic fluid bearing, or a hybrid fluid bearing (e.g., both hydrostatic and hydrodynamic).

As will also be explained in more detail below, the seal support assembly 108 includes a spring arrangement 114 extending between the carrier 104 and a first seal segment 110A of the plurality of seal segments 110 to support the plurality of seal segments 110 of the seal assembly 106. The seal support assembly 108 may further include similar spring arrangements 114 extending between the carrier 104 and the other seal segments 110 of the plurality of seal segments 110. The spring arrangement 114 may include any retraction mechanism, such as but not limited to a pneumatic retraction mechanism, a magnetic retraction mechanism, a mechanical retraction mechanism, thermal based retraction mechanism, or others.

Figure 3:
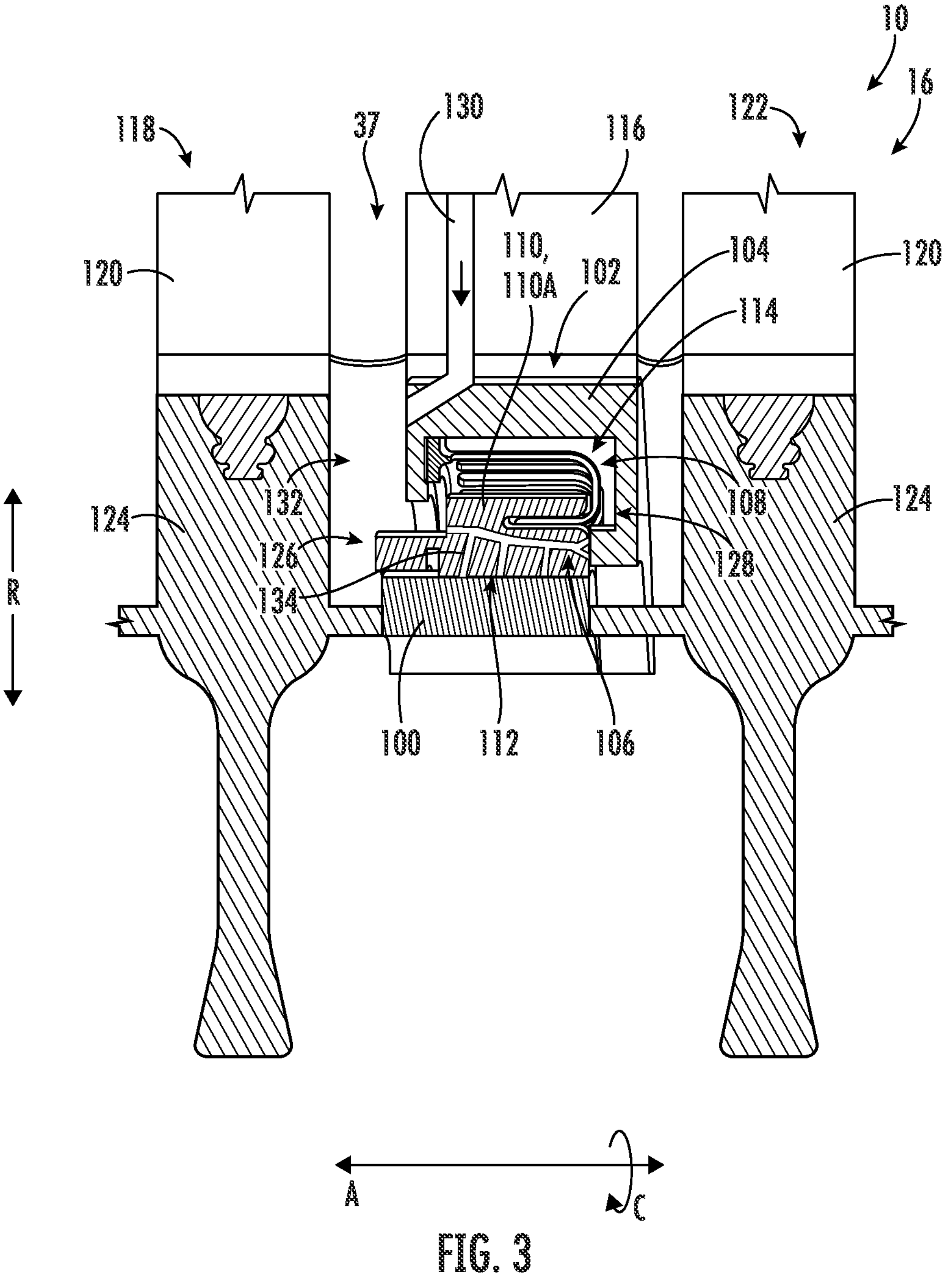
FIG. 3 is a close-up, schematic, cross-sectional view of a portion of the turbomachine of FIG. 2, taken along Line 3-3 and FIG. 2, in accordance with embodiments of the present disclosure.

Further, referring now to FIG. 3, a close-up, schematic, cross-sectional view is depicted, taken along Line 3-3 and FIG. 2. In particular, FIG. 3 depicts the first seal segment 110A of the plurality of seal segments 110 positioned between the rotor 100 and the carrier 104 of the stator 102.

As will be appreciated, the stator 102 further includes a stator vane 116 and the seal assembly 106 is, in the embodiment depicted, positioned at an inner end of a stator vane 116 along the radial direction R of the turbomachine 16. The turbomachine 16 further includes a first stage 118 of rotor blades 120 and a second stage 122 of rotor blades 120 spaced along the axial direction A of the gas turbine engine 10. The seal assembly 106 is positioned between the first stage 118 of rotor blades 120 and the second stage 122 of rotor blades 120 along the axial direction A.

In the embodiment depicted, the seal assembly 106 is positioned within a turbine section of the gas turbine engine 10, such as within the HP turbine 28 or the LP turbine 30. In such a manner, it will be appreciated that the rotor 100 may be a rotor coupled to the HP turbine 28, such as the HP shaft 34, or a rotor coupled to the LP turbine 30, such as the LP shaft 36. More specifically, still, in the embodiment affected, the rotor 100 is a connector extending between a disk 124 of the first stage 118 of rotor blades 120 and a disk 124 of the second stage of rotor blades 120.

It will further be appreciated that the seal assembly 106 defines a high-pressure side 126 and a low-pressure side 128. The high-pressure side 126 may be forward of the low-pressure side 128. The seal assembly 106 is operable to prevent or minimize an airflow from the high-pressure side 126 to the low-pressure side 128 between the rotor 100 and the seal assembly 106. In particular, it will be appreciated that the first seal segment 110A depicted includes the seal face 112 configured to form a fluid bearing with the rotor 100 to support the rotor 100 along the radial direction R and prevent or minimize the airflow from the high-pressure side 126 to the low-pressure side 128 between the rotor 100 and the seal assembly 106.

As will be appreciated, the first seal segment 110A may be in fluid communication with a high-pressure air source to provide a high-pressure fluid flow to the seal face 112 to form the fluid bearing with the rotor 100. In at least certain exemplary aspects, the high-pressure air source may be the working gas flowpath 37 through the gas turbine engine 10 and the seal assembly 106, and more specifically the first seal segment 110A, may be in fluid communication with the high-pressure air source, e.g., at the high-pressure side 126 of the seal assembly 106.

In particular, for the embodiment depicted, referring back briefly also to FIG. 1, the gas turbine engine 10 further includes a high-pressure air duct 130 extending from the high-pressure air source and in fluid communication with seal assembly 106. As noted, the high-pressure air source is the working gas flowpath 37, and more specifically is a portion of the working gas flowpath defined by the HP compressor 24 of the compressor section (see FIG. 1). The high-pressure air duct 130 extends to and through the stator vane 116 and to a high-pressure cavity 132 defined at the high-pressure side 126 of the seal assembly 106 (e.g., between the stator 102 and the rotor 100). A high-pressure airflow from the high-pressure air duct 130 may pressurize the high-pressure cavity 132 to prevent gasses from the working gas flowpath 37 (which may be combustion gasses) from entering the high-pressure cavity 132 and damaging one or more components exposed thereto. The high-pressure airflow may also feed the seal assembly 106. For example, the exemplary first seal segment 110A defines a plurality of air ducts 134 extending therethrough, extending between one or more inlets in airflow communication with the high-pressure cavity 132 and one or more outlets in airflow communication with the seal face 112 to provide a necessary high-pressure airflow to form the fluid bearing with the rotor 100.

In other exemplary embodiments, the seal assembly 106 may be integrated into, e.g., a compressor section of the gas turbine engine 10. In such a case, the high-pressure side 126 may be positioned on a downstream side or aft side of seal assembly 106, and the low-pressure side 128 may be positioned on an upstream side forward side of the seal assembly 106.

Figure 4:
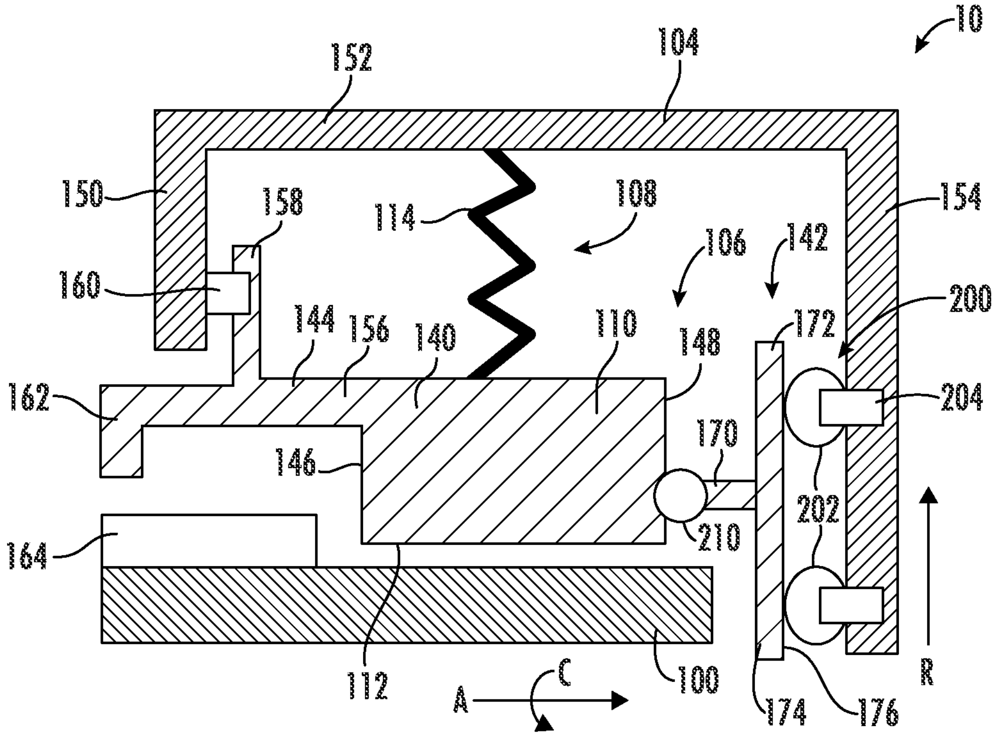
FIG. 4 illustrates a cross-sectional view of a portion of a gas turbine engine in accordance with embodiments of the present disclosure.
Figure 5:
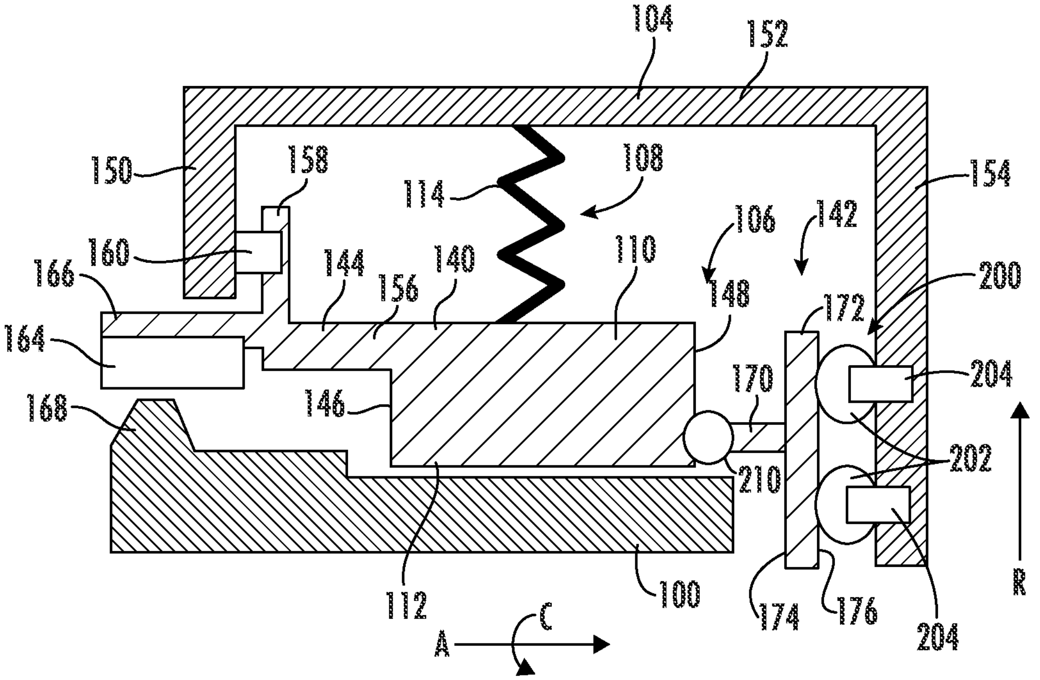
FIG. 5 illustrates a cross-sectional view of a portion of a gas turbine engine in accordance with embodiments of the present disclosure.

FIGS. 4 and 5 each illustrate a cross-sectional view of a portion of a gas turbine engine 10. As shown, the gas turbine engine 10 may define an axial direction A, a radial direction R perpendicular to the axial direction A, and a circumferential direction C extending about the axial direction A. The gas turbine engine 10 may include a rotor 100, a stator 102 having a carrier 104, a seal assembly 106 disposed between the rotor 100 and the stator 102, and a seal support assembly 108. The carrier 104 may include a first radial portion 150, a second radial portion 154 spaced apart from the first radial portion 150, and an axial portion 152 extending between the first radial portion 150 and the second radial portion 154.

The rotor 100 may be any rotor of the turbomachine 16, such as the LP shaft 36, the HP shaft 34, etc. The exemplary seal assembly 106 includes a seal segment 110 (which may be a first seal segment in a plurality of seal segments 110 arranged along the circumferential direction C as shown in FIG. 2). The seal segment 110 has a seal face 112 configured to form a fluid bearing with the rotor 100, and more specifically a radial fluid bearing (i.e., configured to constrain the rotor 100 along the radial direction R).

In many embodiments, the seal segment 110 may include a body 140, an aft bearing 142, and a forward arm 144. The forward arm 144 may extend from a forward or first side 146 of the body 140, and the aft bearing 142 may extend from an aft or second side 148 of the body 140. The forward arm 144 may include an axial portion 156 and a radial portion 158. The axial portion 156 of the forward arm 144 may extend generally axially from the first side 146 of the body 140, and the radial portion 158 of the forward arm 144 may extend generally radially from the axial portion 156. In exemplary embodiments, as shown, the aft bearing 142 may include an arm 170 and a thrust pad 172. The arm 170 may extend axially between the body 140 of the seal segment 110 and the thrust pad 172. The thrust pad 172 may define a forward surface 174 and an aft surface 176. The arm 170 may extend between the second side 148 of the body 140 and the forward surface 174 of the thrust pad 172. The thrust pad 172 may extend generally radially (e.g., radially inward and radially outward) from the arm 170, and the aft surface 176 of the thrust pad 172 may face the second radial portion 154 of the carrier 104.

A piston rod 160 may be disposed between the radial portion 158 of the forward arm 144 and the carrier 104. Particularly, the piston rod 160 may be coupled to the first radial portion 150 of the carrier 104. The piston rod 160 may extend into, and contact, the radial portion 158 of the forward arm 144. The piston rod 160 may be rigidly coupled to the carrier 104 and in contact with the forward arm 144 of the seal segment 110. Particularly, the piston rod 160 may extend into a cavity defined in the forward arm 144 of the seal segment 110.

In some embodiments, as shown in FIG. 4, the seal segment 110 may further include a primary tooth 162 extending from the forward arm 144. For example, the primary tooth 162 may extend forward from the junction between the axial portion 156 and the radial portion 158 of the forward arm 144. The primary tooth 162 may extend radially inward from the axial portion 156 of the forward arm 144 towards the rotor 100. In such embodiments, as shown in FIG. 4, a abradable pad 164 may be coupled to the rotor 100. The abradable pad 164 may contact the primary tooth 162 of the seal segment 110 (e.g., intermittently throughout the operation of the gas turbine engine 10). The abradable pad 164 may be a sacrificial component that wears down over time due to frictional contact between the abradable pad 164 and the primary tooth 162. The abradable pad 164 may be replaceable during routine maintenance of the gas turbine engine 10. Accordingly, the abradable pad 164 may advantageously increase the hardware life of the rotor 100 by preventing direct contact between the rotor 100 and the seal segment 110.

Alternatively, as shown in FIG. 5, the seal segment 110 may include a pad support 166 extending from the forward arm 144. For example, the pad support 166 may extend forward from the junction between the axial portion 156 and the radial portion 158 of the forward arm 144. In such embodiments, the abradable pad 164 may be coupled to the pad support 166 of the seal segment 110, and the rotor 100 may include a rotor tooth 168. The rotor tooth 168 may extend towards the abradable pad 164. For example, the rotor tooth 168 may extend radially outwardly from the rotor

100 towards the abradable pad 164. The abradable pad 164 may contact the rotor tooth 168 of the rotor 100 (e.g., intermittently throughout the operation of the gas turbine engine 10). The abradable pad 164 may be a sacrificial component that wears down over time due to frictional contact between the abradable pad 164 and the rotor tooth 168. The abradable pad 164 may be replaceable during routine maintenance of the gas turbine engine 10. Accordingly, the abradable pad 164 may advantageously increase the hardware life of the rotor 100 by preventing direct contact between the rotor 100 and the seal segment 110.

In exemplary embodiments, the gas turbine engine 10 may further include a roller assembly 200 having one or more rolling elements 202 coupled to one of the aft bearing 142 or the carrier 104. The one or more rolling elements 202 may be in rolling contact with the other of the aft bearing 142 or the carrier 104. For example, as will be discussed in more detail below with reference to FIGS. 6 and 7, in some embodiments, the one or more rolling elements 202 may be coupled to the aft bearing 142 and in rolling contact with the carrier 104. In other embodiments, the one or more rolling elements 202 may be coupled to the carrier 104 and in rolling contact with the aft bearing 142. In some embodiments, the rolling elements 202 may be ball bearings (e.g., spherical ball bearings). In such embodiments, the rolling elements 202 may be supported by a race assembly (e.g., an inner race and an outer race). In other embodiments, the rolling elements 202 may be rollers supported by a bracket assembly (e.g., wheels, casters, or other rolling elements supported by a bracket assembly). The roller assembly 200 may advantageously prevent rubbing or frictional wear between the carrier 104 and the thrust pad 172 during operation of the gas turbine engine 10. For example, the seal segment 110 may move in small radial increments (e.g., between about 0 and 10 inches) relative to the carrier 104 during the operation of the gas turbine engine 10. The roller assembly 200 may advantageously prevent frictional wear between the aft bearing 142 and the carrier 104 due to these small radial movements.

Figure 6:
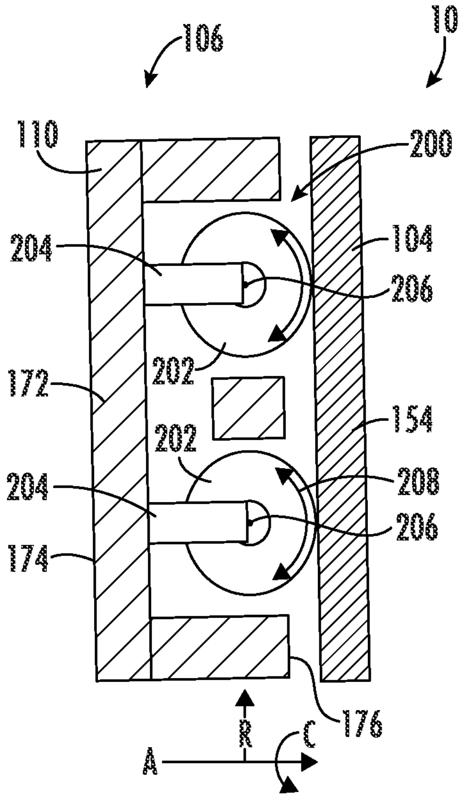
FIG. 6 illustrates an enlarged cross-sectional view of a portion of a gas turbine engine, including a portion of a carrier and a seal assembly, in accordance with embodiments of the present disclosure.
Figure 7:
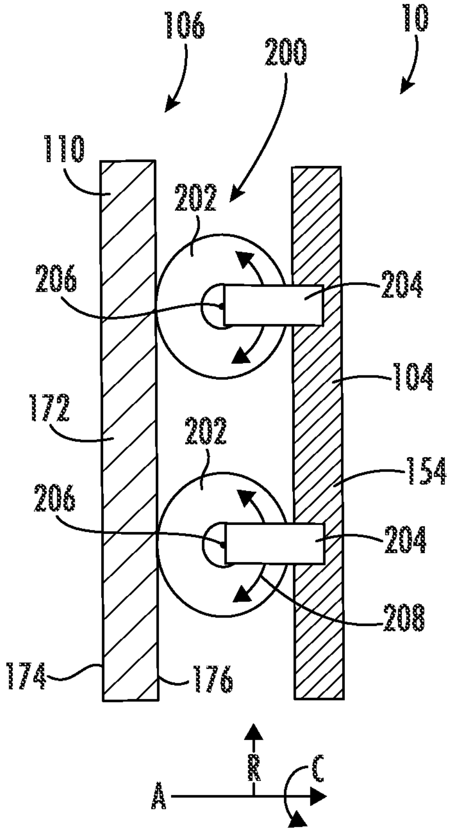
FIG. 7 illustrates an enlarged cross-sectional view of a portion of a gas turbine engine, including a portion of a carrier and a seal assembly, in accordance with embodiments of the present disclosure.

FIGS. 6 and 7 each illustrate an enlarged cross-sectional view of a portion of the gas turbine engine 10, including a portion of the carrier 104 and the seal assembly 106, in accordance with embodiments of the present disclosure. As shown in FIG. 6, in many embodiments, the roller assembly 200 may include one or more rolling elements 202 coupled to the aft bearing 142. In such embodiments, as shown, the rolling elements 202 may be in rolling contact with the second radial portion 154 of the carrier 104. Particularly, the one or more rolling elements 202 may be coupled to the aft surface 176 of the thrust pad 172. In many embodiments, the roller assembly 200 may include brackets 204 that couple the rolling elements 202 to the thrust pad 172. For example, each bracket 204 may extend from the thrust pad 172 to a rolling element 202. In some embodiments, a pin 206 may extend through the bracket 204 and the rolling element 202, such that the rolling element 202 is rotatable about the pin 206 (e.g., each rolling element 202 may be rotatable about a pin 206 in the direction indicated by arrow 208). In this way, the rolling elements 202 may translate with the thrust pad 172 to which they are attached. The rolling elements 202 may contact the carrier 104, such that the rolling elements 202 may rotate about the pin 206 when the thrust pad 172 moves radially relative to the carrier 104.

In other embodiments, as shown in FIG. 7, the roller assembly 200 may include one or more rolling elements 202 coupled to the second radial portion 154 of the carrier 104. In such embodiments, as shown, the rolling elements 202 may be in rolling contact with the thrust pad 172 of the aft bearing 142. Particularly, the one or more rolling elements 202 may be coupled to the second radial portion 154 of the carrier 104 and in rolling contact with the aft surface 176 of the thrust pad 172. In many embodiments, the roller assembly 200 may include brackets 204 that couple the rolling elements 202 to the carrier 104. For example, each bracket 204 may extend from the second radial portion 154 of the carrier 104 to a rolling element 202. In some embodiments, a pin 206 may extend through the bracket 204 and the rolling element 202, such that the rolling element 202 is rotatable about the pin 206 (e.g., each rolling element 202 may be rotatable about a pin 206 in the direction indicated by arrow 208). In this way, the rolling elements 202 may translate with the carrier 104 to which they are attached. The rolling elements 202 may contact the thrust pad 172, such that the rolling elements 202 may rotate about the pin 206 when the carrier 104 moves radially relative to the thrust pad 172.

Figure 8:
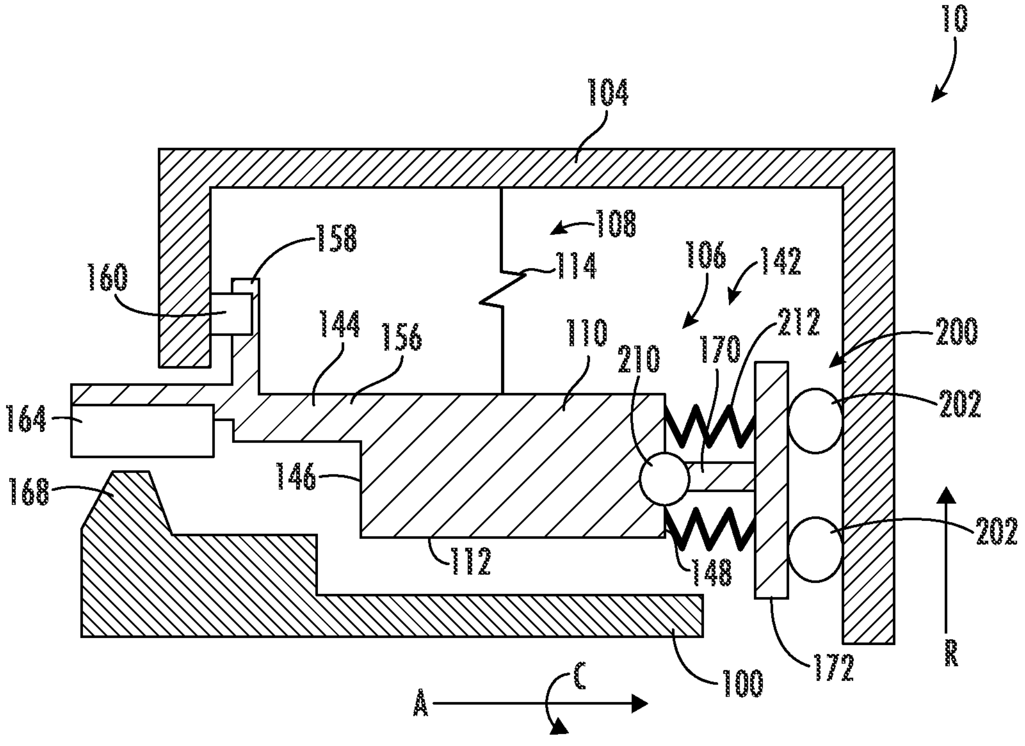
FIG. 8 illustrates a cross-sectional view of a portion of a gas turbine engine, in which a carrier is in a first position, in accordance with embodiments of the present disclosure.
Figure 9:
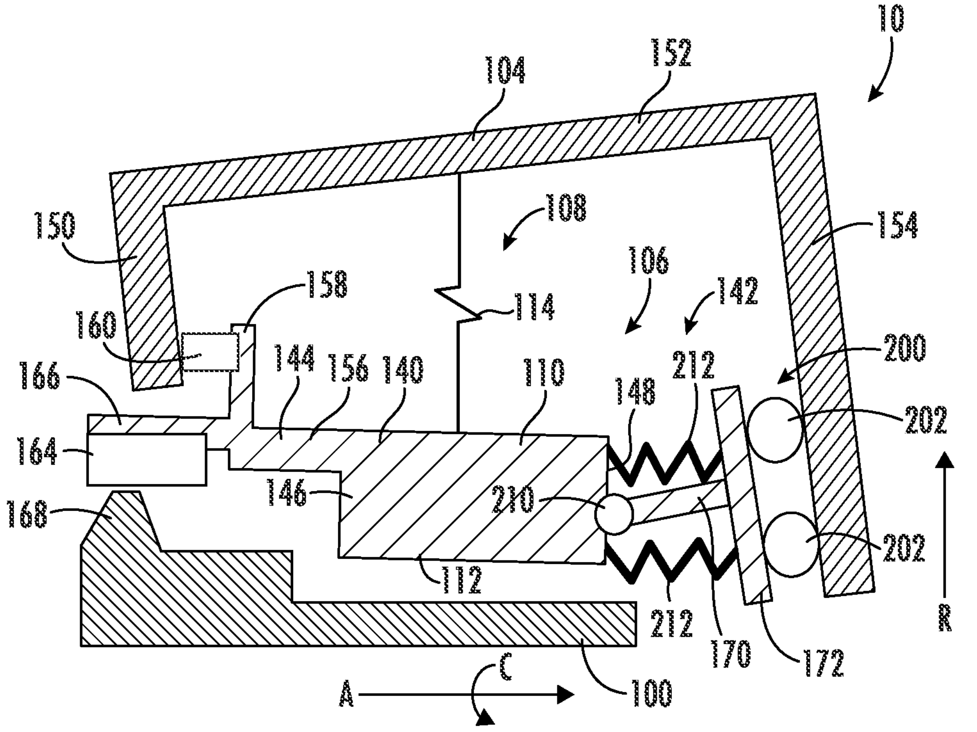
FIG. 9 illustrates a cross-sectional view of a portion of a gas turbine engine, in which a carrier is in a second position, in accordance with embodiments of the present disclosure.

Referring now to FIGS. 8 and 9, a cross-sectional view of a portion of a gas turbine engine 10 is illustrated in two different positions. For example, the carrier 104 may be in a first position in FIG. 8 and a second position in FIG. 9, and the seal assembly 106 may react to the changes in position as shown in FIGS. 8 and 9. As shown, in many embodiments, the aft bearing 142 may include a flex pivot 210 that couples the aft bearing 142 to the body 140 of the seal segment 110, such that the aft bearing 142 is rotatable about the flex pivot 210 relative to the body 140. Particularly, the flex pivot 210 may couple the arm 170 of the aft bearing 142 to the body 140 of the seal segment 110. The flex pivot 210 may be a pin, bearing, hinge, or other coupling that allows for rotation between the aft bearing 142 and the body 140 of the seal segment 110. As shown by comparing FIG. 8 and FIG. 9, the carrier 104 may be movable relative to the rotor 100 and the seal segment 110 during operation of the gas turbine engine 10. The flex pivot 210 may advantageously allow the roller assembly 200 to maintain contact between the thrust pad 172 and the carrier 104 when the carrier 104 rotates or moves relative to the rotor 100.

In many embodiments, one or more axial biasing elements 212 may extend (e.g., axially) between the thrust pad 172 and the body 140 of the seal segment 110. For example, each of the one or more axial biasing elements 212 may extend axially between the second side 148 of the body 140 and the forward surface 174 of the thrust pad 172. In many embodiments, as shown, a first axial biasing element of the one or more axial biasing elements 212 may be disposed radially outward of the arm 170, and a second axial biasing element of the one or more axial biasing elements 212 may be disposed radially inwardly of the arm 170.

Figure 10:
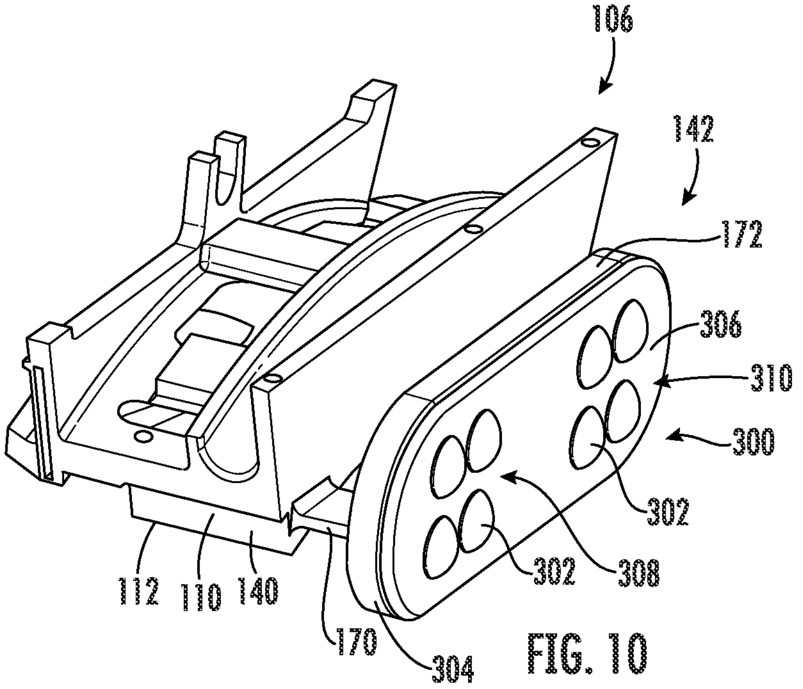
FIG. 10 illustrates a perspective view of a seal segment of a seal assembly having a roller assembly in accordance with embodiments of the present disclosure.

Referring now to FIG. 10, a perspective view of a seal segment 110 of a seal assembly 106 is illustrated in accordance with embodiments of the present disclosure. As shown in FIG. 10, the seal segment 110 may include a body 140 and an aft bearing 142 extending from the body 140. The aft bearing 142 may include a thrust pad 172 and an arm 170 extending between the body 140 and the thrust pad 172.

Additionally, as shown in FIG. 10, a roller assembly 300 may be coupled to the aft bearing 142. The roller assembly 300 may include a plurality of rolling elements 302, which may be in contact with the carrier 104 during operation of the gas turbine engine 10. The plurality of rolling elements 302 may be spherical ball bearings held in place by an inner race 304 and an outer race 306. In exemplary embodiments, as shown, the thrust pad 172 may be the inner race 304, and the outer race 306 may couple to the thrust pad 172 to secure the plurality of rolling elements 302 thereto. Particularly, the thrust pad 172 may define the inner race 304, and the outer race 306 may couple to the inner race 304. The one or more rolling elements 302 may be disposed at least partially between the inner race 304 and the outer race 306 (e.g., the rolling elements 302 may be held in place by the inner race 304 and the outer race 306 but may protrude from the outer race 306 in order to make rolling contact with the carrier 104). The plurality of rolling elements 302 may be arranged in two groups of four rolling elements 302 circumferentially spaced apart from one another on the thrust pad 172. For example, the plurality of rolling elements 302 may be arranged in a first group 308 and a second group 310 of four rolling elements 302. The first group 308 and the second group 310 may each include four rolling elements 302 arranged in a square pattern.

Figure 11:
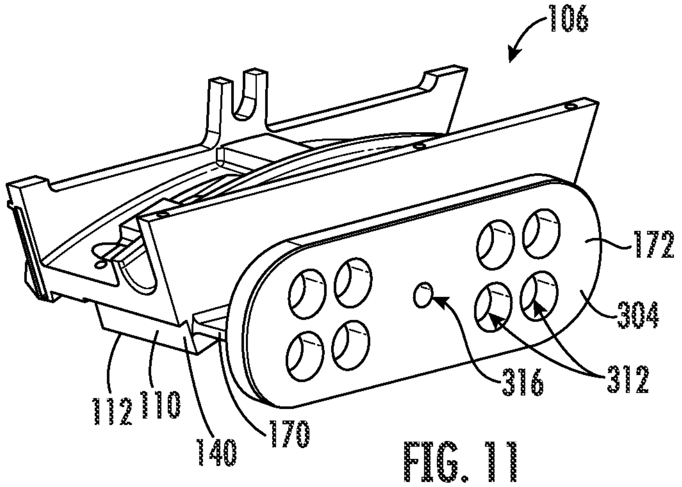
FIG. 11 illustrates a perspective view the seal segment of the seal assembly having the roller assembly shown in FIG. 10, without an outer race, in accordance with an exemplary aspect of the present disclosure.
Figure 12:
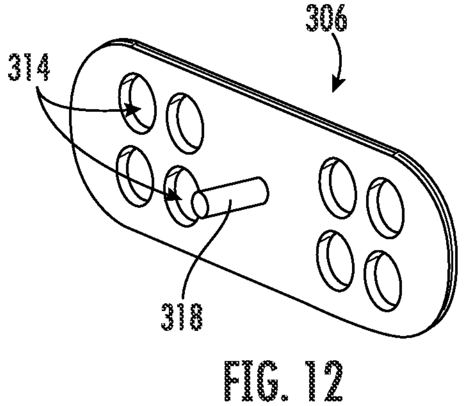
FIG. 12 illustrates a perspective view of an outer race of the roller assembly in accordance with embodiments of the present disclosure.

FIG. 11 illustrates a perspective view the seal segment 110 of the seal assembly 106 shown in FIG. 10 without the outer race 306, in order to illustrate the details of the inner race 304. FIG. 12 illustrates a perspective view of the outer race 306 in accordance with embodiments of the present disclosure. As shown in FIG. 11, the inner race 304 (and/or the thrust pad 172) may define a plurality of cavities 312. As shown in FIG. 12, the outer race 306 may define a plurality of holes 314, which may align with the plurality of cavities 312. A rolling element 302 may be positioned within each cavity 312, and the rolling element 302 may be held in place by the outer race 306 and may extend through a respective hole 314 defined in the outer race 306. In this way, the holes 314 may have a diameter that is smaller than a diameter of the rolling elements 302, such that the rolling elements 302 may extend through the holes 314 but may be held in place by the outer race 306.

In many embodiments, as shown in FIG. 11, the inner race 304 (and/or the thrust pad 172) may defines an opening 316. The opening 316 may be centered on the thrust pad 172. For example, the opening 316 may be disposed between the first group 308 and the second group 310 of the rolling elements 302. Additionally, as shown in FIG. 12, the outer race 306 may include a central member 318, which may extend through the opening 316 to couple the outer race 306 to the inner race 304.

Figure 13:
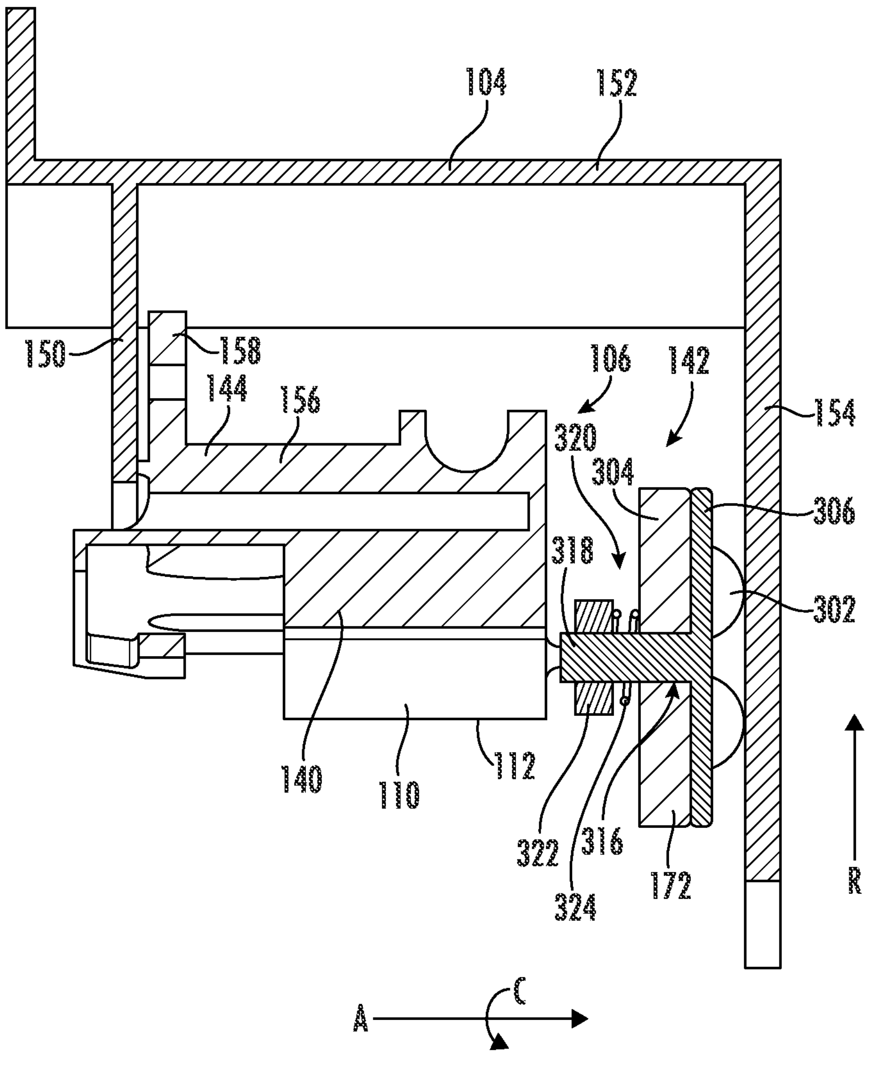
FIG. 13 illustrates a cross-sectional view of a portion of a gas turbine engine, which includes the seal assembly shown and described above with reference to FIGS. 10-12, in accordance with embodiments of the present disclosure.

Referring now to FIG. 13, a cross-sectional view of a portion of a gas turbine engine 10, which includes the seal assembly 106 shown and described above with reference to FIGS. 10-12, is illustrated in accordance with embodiments of the present disclosure. As shown in FIG. 13, the roller assembly 300 may be coupled to the aft bearing 142. For example, a plurality of rolling elements 302 may be coupled to the thrust pad 172 via the inner race 304 and the outer race 306, and the plurality of rolling elements 302 may protrude (e.g., axially protrude) from the outer race 306 to make rolling contact with the second radial portion 154 of the carrier 104.

In many embodiments, as shown in FIG. 13, a spring assembly 320 may couple to the central member 318. Particularly, the central member 318 of the outer race 306 may extend through the opening 316 of the inner race 304 (and/or the thrust pad 172), and the spring assembly 320 may couple to the central member 318 forward of the thrust pad 172. The spring assembly 320 may include a ring member 322 and a biasing element 324. The ring member 322 and the biasing element 324 may surround the central member 318 forward of the thrust pad 172. For example, the ring member 322 may be coupled to the central member 318 axially between the body 140 and the thrust pad 172, and the biasing element 324 may extend between the ring member 322 and the forward surface 174 of the thrust pad 172. The spring assembly 320 may advantageously allow the outer race 306 to move slightly in the axial direction A in order to maintain contact between the carrier 104 and the rolling elements 302 during operation of the gas turbine engine 10.

In exemplary embodiments, the roller assembly 300 may be a dry roller assembly. That is, the dry roller assembly may not include any lubricant or oils. For example, no oil or lubricant may be present between the inner race 304 and the outer race 306 or around the rolling elements 302. Rather, the rolling elements may make dry contact with the inner race 304, the outer race 306, and the carrier 104. Lubricants and/or oils are not necessarily due to the relatively low forces between the thrust pad 172 and the carrier 104 (e.g., between 0-5 pounds typically) and due to the relatively low movement between the thrust pad 172 and the carrier 104 (e.g., very small radial micromovements of between about 0-10 inches). Additionally, lubricants and/or oils and are not practical in this environment due to the intense heat of the gas turbine engine 10 (e.g., the lubricants may burn away if used).

In various embodiments, the one or more rolling elements 302 may be composed of ceramic and/or metal. For example, in exemplary embodiments, the one or more rolling elements 302 may be composed of at least one of silicon nitride or silicon carbide. These materials may advantageously be capable of operation in extremely high temperatures, such as greater than about 1200° F.

Figure 14:
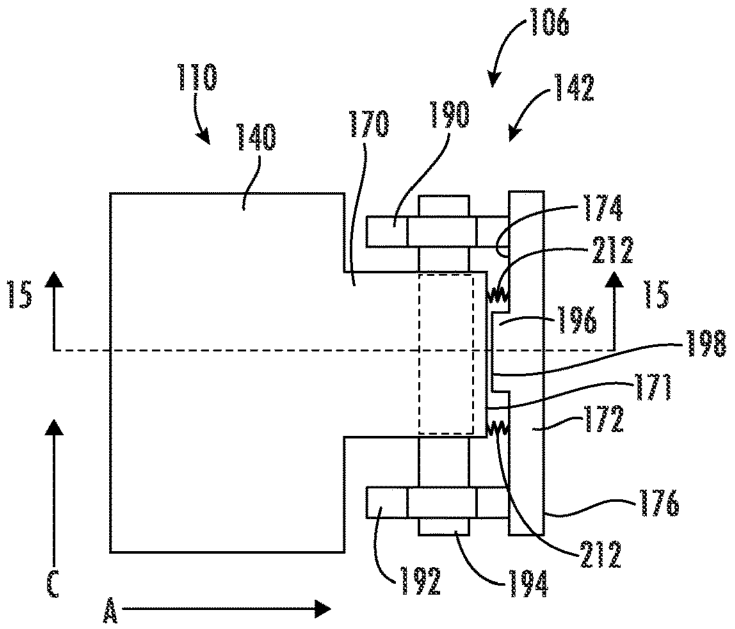
FIG. 14 illustrates a planar view of a seal assembly in accordance with embodiments of the present disclosure.
Figure 15:
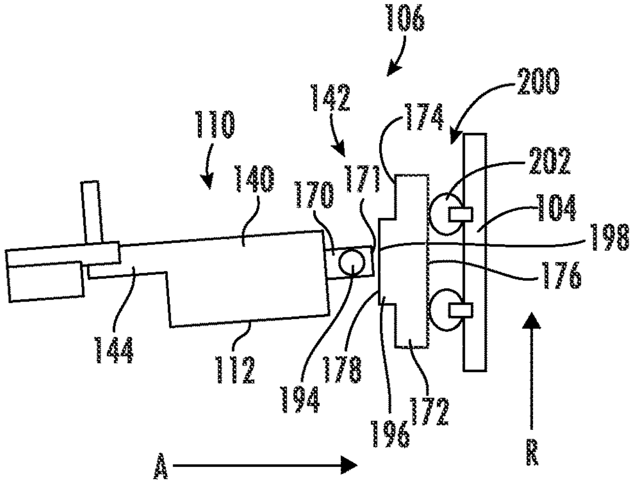
FIG. 15 illustrates a cross-sectional view of the seal assembly shown in FIG. 14 from along the line 15-15 in a first position in accordance with embodiments of the present disclosure.
Figure 16:
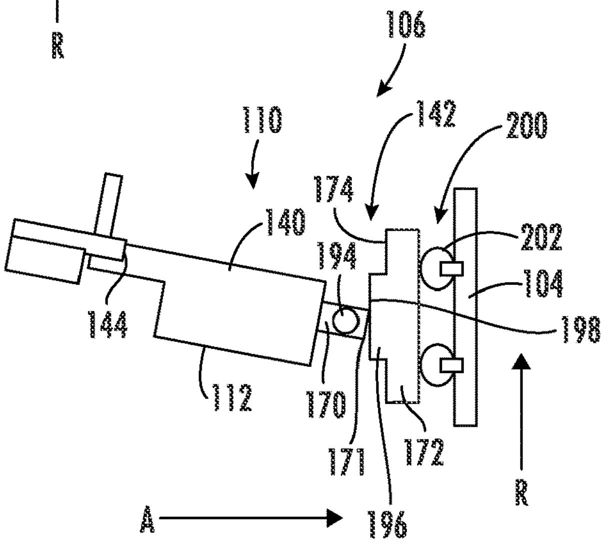
FIG. 16 illustrates a cross-sectional view of the seal assembly in a second position in accordance with embodiments of the present disclosure.

FIGS. 14 through 16 illustrate various views of a seal assembly 106 in accordance with additional embodiments of the present disclosure. Particularly, FIG. 14 illustrates a planar view of the seal assembly 106, FIG. 15 illustrates a cross-sectional view of the seal assembly 106 shown in FIG. 14 from along the line 15-15 in a first position, and FIG. 16 illustrates a cross-sectional view of the seal assembly 106 in a second position. As shown in FIGS. 14 through 16, the exemplary seal assembly 106 includes a seal segment 110 having a seal face 112 configured to form a fluid bearing with a rotor (such as the rotor 100 shown and described above).

Additionally, the seal segment 110 may include a body 140, an aft bearing 142, and a forward arm 144. The forward arm 144 may extend from a forward side of the body 140, and the aft bearing 142 may extend from an aft side of the body 140. In exemplary embodiments, as shown, the aft bearing 142 may include an arm 170 and a thrust pad 172. The arm 170 may extend axially from the body 140 of the seal segment 110 to a terminal end 171 (e.g., an axially terminal end). The thrust pad 172 may define a forward surface 174 and an aft surface 176. The terminal end 171 of the arm 170 may be axially spaced apart from the forward surface 174 of the thrust pad 172.

As shown in FIG. 14, the thrust pad 172 may include a first flange 190 and a second flange 192 spaced apart from one another in the circumferential direction C. The first flange 190 and the second flange 192 may extend from the forward surface 174 of the thrust pad 172 generally parallel to the arm 170 of the seal segment 110 (e.g., generally axially). Additionally, the first flange 190 and the second flange 192 may be positioned on either side (circumferentially) of the arm 170. A pin 194 may extend through the first flange 190, the arm 170, and the second flange 192 to pivotably couple the seal segment 110 to the thrust pad 172. For example, the seal segment 110 may be rotatably coupled to the thrust pad 172 via the pin 194.

In many embodiments, the thrust pad 172 may further include a tilt delimiter 196 extending axially from the forward surface 174 of the thrust pad 172 towards the terminal end 171 of the arm 170. The tilt delimiter 196 may define a contact surface 198, which may be the axially forward-most surface of the thrust pad 172. The contact surface 198 may be axially spaced apart from the terminal end 171 of the arm 170. As shown in FIGS. 15 and 16, the tilt delimiter 196 may limit how far the seal segment 110 can rotate about the pin 194 by forcing contact between the terminal end 171 of the arm 170 and the contact surface 198. For example, as shown in FIG. 15, when the seal segment 110 rotates in radially outward direction about the pin 194, the tilt delimiter 196 may prevent over rotation by engaging in contact with the arm 170. Similarly, as shown in FIG. 16, when the seal segment 110 rotates in radially inward direction about the pin 194, the tilt delimiter 196 may prevent over rotation by engaging in contact with the arm 170.

One or more axial biasing elements 212 may extend (e.g., axially) between the thrust pad 172 and the body 140 of the seal segment 110. For example, each of the one or more axial biasing elements 212 may extend axially between the aft side of the body 140 and the forward surface 174 of the thrust pad 172. In many embodiments, as shown, a first axial biasing element of the one or more axial biasing elements 212 may be disposed circumferentially outward of the arm 170, and a second axial biasing element of the one or more axial biasing elements 212 may be disposed circumferentially inward of the arm 170.

In exemplary embodiments, a roller assembly 200 having one or more rolling elements 202 coupled to one of the carrier 104 may engage the aft end of the thrust pad 172. The one or more rolling elements 202 may be coupled to the carrier 104 and in rolling contact with the thrust pad 172. The pin 194 may advantageously allow the thrust pad 172 to maintain contact with the rolling elements 202 when the body 140 and the arm 170 of the seal segment 110 move and/or rotate in response to forces of the gas turbine engine 10.

Further aspects are provided by the subject matter of the following clauses:

A turbine engine defining an axial direction and a radial direction, the turbine engine comprising: a rotor; a stator comprising a carrier; a seal assembly disposed between the rotor and the stator, the seal assembly comprising a plurality of seal segments, the plurality of seal segments including a seal segment having a seal face forming a fluid bearing with the rotor, a body, and an aft bearing extending from the body; and a roller assembly having one or more rolling elements coupled to one of the aft bearing or the carrier, the one or more rolling elements in rolling contact with the other of the aft bearing or the carrier.

The turbine engine of any preceding clause, wherein the one or more rolling elements are coupled to the carrier and in rolling contact with the aft bearing.

The turbine engine of any preceding clause, wherein the one or more rolling elements are coupled to the aft bearing and in rolling contact with the carrier.

The turbine engine of any preceding clause, wherein the aft bearing includes an arm and a thrust pad, the arm extending axially between the body of the seal segment and the thrust pad.

The turbine engine of any preceding clause, wherein the aft bearing includes a flex pivot coupling the body of the seal segment to the arm of the aft bearing.

The turbine engine of any preceding clause, wherein one or more axial biasing elements extends between the thrust pad and the body of the seal segment.

The turbine engine of any preceding clause, wherein the roller assembly is a dry roller assembly.

The turbine engine of any preceding clause, wherein the thrust pad defines an inner race, wherein the roller assembly further comprises an outer race coupled to the inner race, and wherein the one or more rolling elements are disposed at least partially between the inner race and the outer race.

The turbine engine of any preceding clause, wherein the thrust pad defines an opening, wherein the outer race further comprises a central member that extends through the opening, and wherein a spring assembly couples to the central member.

The turbine engine of any preceding clause, wherein the one or more rolling elements are composed of at least one of silicon nitride or silicon carbide.

The turbine engine of any preceding clause, further comprising an abradable pad coupled to the rotor, and wherein the seal segment comprises a primary tooth extending towards the abradable pad.

The turbine engine of any preceding clause, further comprising an abradable pad coupled to the seal segment, and wherein the rotor includes a rotor tooth extending towards the abradable pad.

A turbine engine defining an axial direction and a radial direction, the turbine engine comprising: a rotor; a stator comprising a carrier; a seal assembly disposed between the rotor and the stator, the seal assembly comprising a plurality of seal segments, the plurality of seal segments including a seal segment having a seal face forming a fluid bearing with the rotor, a body, and an aft bearing extending from the body, wherein the aft bearing includes an arm and a thrust pad, the arm extending axially between the body of the seal segment and the thrust pad, and wherein the aft bearing includes a flex pivot coupling the body of the seal segment to the arm of the aft bearing; and a roller assembly having one or more rolling elements coupled to one of the aft bearing or the carrier, the one or more rolling elements in rolling contact with the other of the aft bearing or the carrier.

The turbine engine of any preceding clause, wherein the one or more rolling elements are coupled to the carrier and in rolling contact with the aft bearing.

The turbine engine of any preceding clause, wherein the one or more rolling elements are coupled to the aft bearing and in rolling contact with the carrier.

The turbine engine of any preceding clause, wherein one or more axial biasing elements extends between the thrust pad and the body of the seal segment.

The turbine engine of any preceding clause, wherein the roller assembly is a dry roller assembly.

The turbine engine of any preceding clause, wherein the thrust pad defines an inner race, wherein the roller assembly further comprises an outer race coupled to the inner race, and wherein the one or more rolling elements are disposed at least partially between the inner race and the outer race.

The turbine engine of any preceding clause, wherein the thrust pad defines an opening, wherein the outer race further comprises a central member that extends through the opening, and wherein a spring assembly couples to the central member.

The turbine engine of any preceding clause, wherein the one or more rolling elements are composed of at least one of silicon nitride or silicon carbide.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A turbine engine defining an axial direction and a radial direction, the turbine engine comprising:

a rotor;

a stator comprising a carrier;

a seal assembly disposed between the rotor and the stator, the seal assembly comprising a plurality of seal segments, the plurality of seal segments including a seal segment having a seal face forming a fluid bearing with the rotor, a body, and an aft bearing extending from the body;

a roller assembly having one or more rolling elements coupled to the carrier, the one or more rolling elements in rolling contact with the aft bearing, the roller assembly disposed axially between the aft bearing and a radial portion of the carrier, wherein the one or more rolling elements comprises at least one wheel, caster, or roller bearing; and a spring assembly disposed radially between the seal segment and an axial portion of the carrier.

2. The turbine engine of claim 1, wherein the one or more rolling elements are coupled to the aft bearing and in rolling contact with the carrier.

3. The turbine engine of claim 1, wherein the aft bearing includes an arm and a thrust pad, the arm extending axially between the body of the seal segment and the thrust pad.

4. The turbine engine of claim 3, wherein the aft bearing includes a flex pivot coupling the body of the seal segment to the arm of the aft bearing.

5. The turbine engine of claim 4, wherein one or more axial biasing elements extends between the thrust pad and the body of the seal segment.

6. The turbine engine of claim 1, wherein the roller assembly is a dry roller assembly.

7. The turbine engine of claim 3, wherein the thrust pad defines an inner race, wherein the roller assembly further comprises an outer race coupled to the inner race, and wherein the one or more rolling elements are disposed at least partially between the inner race and the outer race.

8. The turbine engine of claim 7, wherein the thrust pad defines an opening, wherein the outer race further comprises a central member that extends through the opening, and wherein a spring assembly couples to the central member.

9. The turbine engine of claim 1, wherein the one or more rolling elements are composed of at least one of silicon nitride or silicon carbide.

10. The turbine engine of claim 1, further comprising an abradable pad coupled to the rotor, and wherein the seal segment comprises a primary tooth extending towards the abradable pad.

11. The turbine engine of claim 1, further comprising an abradable pad coupled to the seal segment, and wherein the rotor includes a rotor tooth extending towards the abradable pad.

12. A turbine engine defining an axial direction and a radial direction, the turbine engine comprising:

a rotor;

a stator comprising a carrier;

a seal assembly disposed between the rotor and the stator, the seal assembly comprising a plurality of seal segments, the plurality of seal segments including a seal segment having a seal face forming a fluid bearing with the rotor, a body, and an aft bearing extending from the body, wherein the aft bearing includes an arm and a thrust pad, the arm extending axially between the body of the seal segment and the thrust pad, and wherein the aft bearing includes a flex pivot coupling the body of the seal segment to the arm of the aft bearing;

a roller assembly having one or more rolling elements coupled to the carrier, the one or more rolling elements in rolling contact with the aft bearing, the roller assembly disposed axially between the thrust pad of the aft bearing and a radial portion of the carrier, wherein the one or more rolling elements comprises at least one wheel, caster, or roller bearing; and a spring assembly disposed radially between the seal segment and an axial portion of the carrier.

13. The turbine engine of claim 12, wherein the one or more rolling elements are coupled to the aft bearing and in rolling contact with the carrier.

14. The turbine engine of claim 12, wherein one or more axial biasing elements extends between the thrust pad and the body of the seal segment.

15. The turbine engine of claim 12, wherein the roller assembly is a dry roller assembly.

16. The turbine engine of claim 12, wherein the thrust pad defines an inner race, wherein the roller assembly further comprises an outer race coupled to the inner race, and wherein the one or more rolling elements are disposed at least partially between the inner race and the outer race.

17. The turbine engine of claim 16, wherein the thrust pad defines an opening, wherein the outer race further comprises a central member that extends through the opening, and wherein a spring assembly couples to the central member.

18. The turbine engine of claim 12, wherein the one or more rolling elements are composed of at least one of silicon nitride or silicon carbide.

* * * * *